(12) United States Patent
Zhao

(10) Patent No.: US 10,909,818 B2
(45) Date of Patent: Feb. 2, 2021

(54) METHOD AND SYSTEM FOR CONTROLLING STATUS INDICATION LIGHT OF PCIE HARD DISK DRIVE

(71) Applicants: INVENTEC (PUDONG) TECHNOLOGY CORPORATION, Shanghai (CN); INVENTEC CORPORATION, Taipei (TW)

(72) Inventor: Wei-Guo Zhao, Shanghai (CN)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 353 days.

(21) Appl. No.: 16/063,263

(22) PCT Filed: Mar. 2, 2016

(86) PCT No.: PCT/CN2016/075317
§ 371 (c)(1),
(2) Date: Jun. 16, 2018

(87) PCT Pub. No.: WO2017/101217
PCT Pub. Date: Jun. 22, 2017

(65) Prior Publication Data
US 2020/0273300 A1    Aug. 27, 2020

(30) Foreign Application Priority Data
Dec. 17, 2015    (CN) .......................... 2015 1 0954770

(51) Int. Cl.
*G08B 5/36*    (2006.01)
*G06F 11/22*    (2006.01)
*G06F 13/42*    (2006.01)

(52) U.S. Cl.
CPC ............. *G08B 5/36* (2013.01); *G06F 11/221* (2013.01); *G06F 13/4221* (2013.01); *G06F 2213/0026* (2013.01)

(58) Field of Classification Search
CPC ..... G08B 5/36; G06F 11/221; G06F 13/4221; G06F 2213/0026; G06F 11/326;
(Continued)

(56) References Cited

U.S. PATENT DOCUMENTS 6,754,726 B1 * 6/2004 Kuo .................... G06F 13/4027
710/305
8,078,770 B1 * 12/2011 Sivertsen ............ G06F 13/4282
710/19
(Continued)

FOREIGN PATENT DOCUMENTS

CN    101996128 A  *  3/2011
CN    101996128 A     3/2011
(Continued)

*Primary Examiner* — Adnan Aziz
(74) *Attorney, Agent, or Firm* — Maschoff Brennan

(57) ABSTRACT

A method and a system for controlling a status indication light of a Peripheral Component Interconnect Express (PCIE) hard disk are disclosed. The method includes determining a current operation mode of the PCIE hard disk and transmitting information of the current operation mode to a southbridge chip by a CPU. The information is transmitted to a complex programmable logic device (CPLD) by the southbridge chip. The display of the status indication light corresponding to the current operation mode is controlled according to the information by the complex programmable logic device. The CPLD is controlled by the southbridge chip, to control display control of the status indication light corresponding to reset and locate operation of the PCIE hard disk. The usage status of the PCIE hard disk may be
(Continued)

determined in real time by performing Hamming check to the information, and the accurate display of status indication light may be ensured.

6 Claims, 4 Drawing Sheets

(58) Field of Classification Search
CPC .... G06F 11/325; G06F 3/0653; G06F 3/0688; G06F 3/0679; G06F 3/0673
See application file for complete search history.

(56) References Cited

U.S. PATENT DOCUMENTS

| | | | | |
|---|---|---|---|---|
| 8,365,012 B2* | 1/2013 | Yagi | ............ | G06F 11/1441 714/4.5 |
| 9,087,548 B2* | 7/2015 | Tian | ............ | G11B 19/2054 |
| 9,122,501 B1* | 9/2015 | Hsu | ............ | G06F 9/44505 |
| 9,811,407 B2* | 11/2017 | Wang | ............ | G06F 11/079 |
| 2005/0060617 A1* | 3/2005 | Huang | ............ | G06F 11/362 714/34 |
| 2008/0282017 A1* | 11/2008 | Carpenter | ............ | G06F 13/4291 710/316 |
| 2009/0222609 A1* | 9/2009 | Ji | ............ | G06F 13/4095 710/302 |
| 2010/0037043 A1* | 2/2010 | Sheets | ............ | G06F 9/4406 713/2 |
| 2011/0099458 A1* | 4/2011 | Reche | ............ | G06F 11/073 714/763 |
| 2011/0219211 A1* | 9/2011 | Sun | ............ | G06F 9/06 712/30 |
| 2011/0271138 A1* | 11/2011 | Aklilu | ............ | G06F 11/0772 714/3 |
| 2012/0047308 A1* | 2/2012 | Feng | ............ | G06F 13/4059 710/311 |
| 2012/0133520 A1* | 5/2012 | Chang | ............ | G06F 13/409 340/635 |
| 2013/0297894 A1* | 11/2013 | Cohen | ............ | G06F 3/0679 711/154 |
| 2014/0189421 A1* | 7/2014 | Werner | ............ | G06F 3/0688 714/6.21 |
| 2016/0062652 A1* | 3/2016 | Hia | ............ | G06F 3/0659 711/102 |
| 2017/0337069 A1* | 11/2017 | Huang | ............ | G06F 11/221 |
| 2018/0113826 A1* | 4/2018 | Li | ............ | G06F 3/0622 |

FOREIGN PATENT DOCUMENTS

| | | | |
|---|---|---|---|
| CN | 202887173 U | | 4/2013 |
| CN | 103914364 A | | 7/2014 |
| CN | 104516802 A | * | 4/2015 |
| CN | 104516802 A | | 4/2015 |

* cited by examiner

METHOD AND SYSTEM FOR CONTROLLING STATUS INDICATION LIGHT OF PCIE HARD DISK DRIVE

TECHNICAL FIELD

The present invention relates to the technical field of PCIE solid-state hard disk, and particularly to a method and a system for controlling a status indication light of a PCIE hard disk.

BACKGROUND

Currently, most of the servers use SATA/SAS hard disks with a transmission speed of 6G, and a small portion of those uses SATA/SAS hard disks with a transmission speed of 12G. As shown in FIG. 1, when the display of the status indication light of a SATA/SAS hard disk with a transmission speed of 6G or 12G is controlled, a central processing unit (CPU) PA1 is connected with a SAS expander PA3 via a SAS device PA2, the SAS expander has a communication connection with a SFF-8639 connector PA4, and then the SFF-8639 connector PA4 is external connected with a SATA/SAS hard disk PA5 with a transmission speed of 6G or 12G, so as to implement the control of the signal light of the SATA/SAS hard disk PA5 with the transmission speed of 6G or 12G. Specifically, the tool of the system end sends a command to the CPU PA1, the CPU PA1 controls the SAS expander by the SAS device to output a small general purpose input output (SGPIO) signal to a complex programmable logic device (CPLD), and then the CPLD analyzes the SGPIO signal and outputs it to the status indication light of the corresponding hard disk, so as to implement the control of the status indication light of the SATA/SAS hard disk PA5 with the transmission speed of 6G or 12G.

With the widespread application of PCIE solid-state hard disks, the PCIE solid-state hard disks (PCIE SSD) have begun to be used in some servers. As shown in FIG. 1, the SFF-8639 connector PA4 provides unshared pins respectively for the SATA/SAS hard disk and the PCIE SSD which have exclusive access to each other. However, the conventional operation mode of the PCIE SSD causes that the CPU PA1 cannot control a status indication light of the PCIE SSD, and thus it cannot determine the usage status of the PCIE SSD in real time.

SUMMARY

In view of the defects in the prior art described above, the purpose of the present invention is to provide a method and a system for controlling a status indication light of a PCIE hard disk which may implement the display control of the status indication light corresponding to reset and locate operation of the PCIE hard disk, so as to easily determine the usage status of the PCIE hard disk in real time.

For the above purpose and other related purposes, the present invention provides a method for controlling a status indication light of a PCIE hard disk comprising steps as follows: determining a current operation mode of the PCIE hard disk; transmitting information of the current operation mode to a southbridge chip by a CPU; transmitting the information of the current operation mode to a complex programmable logic device by the southbridge chip; controlling display of the status indication light corresponding to the current operation mode according to the information of the current operation mode by the complex programmable logic device.

In an embodiment of the present invention, operation modes of the PCIE hard disk comprises a hard disk reset mode and a hard disk locate mode In an embodiment of the present invention, when the information of the current operation mode is transmitted to the southbridge chip, the information of the current operation mode is recorded by an output level register corresponding to a GPIO serial port expander of the southbridge chip.

In an embodiment of the present invention, the output level register totally occupies 64 bits, lower 8 bits are occupied by a BIOS, and 2 bits are used to indicate the operation mode of the PCIE hard disk.

In an embodiment of the present invention, transmitting the information of the current operation mode to the complex programmable logic device by the southbridge chip comprises steps as follows:
performing Hamming check to the information of the current operation mode, and generating Hamming check code data;
transmitting the generated Hamming check code data to the complex programmable logic device.

Furthermore, the present invention also provides a system for controlling a status indication light of a PCIE hard disk, comprising a determining module, a first transmitting module, a second transmitting module and a control module;
the determining module is configured to determine the current operation mode of the PCIE hard disk;
the first transmitting module is connected with the determining module, and configured to transmit information of the current operation mode to a southbridge chip by a CPU;
the second transmitting module is connected with the first transmitting module, and configured to transmit the information of the current operation mode to a complex programmable logic device by the southbridge chip;
the control module is connected with the second transmitting module, and configured to control display of the status indication light corresponding to the current operation mode according to the information of the current operation mode by the complex programmable logic device.

In an embodiment of the present invention, operation modes of the PCIE hard disk comprise a hard disk reset mode and a hard disk locate mode.

In an embodiment of the present invention, when the first transmitting module transmits the information of the current operation mode to the southbridge chip, an output level register corresponding to a GPIO serial port expander of the southbridge chip is used to record the information of the current operation mode.

The specific embodiments of the present invention are further illustrated by the following embodiments and drawings.

In an embodiment of the present invention, the output level register totally occupies 64 bits, lower 8 bits are occupied by a BIOS, and 2 bits are used to indicate the operation mode of the PCIE hard disk.

In an embodiment of the present invention, when the southbridge chip transmits the information of the current operation mode to the complex programmable logic device, steps are comprised as follows:
performing Hamming check to the information of the current operation mode and generating Hamming check code data;
transmitting the generated Hamming check code data to the complex programmable logic device.

As described above, the method and system for controlling the status indication light of the PCIE hard disk of the present invention may have the following beneficial effects:
(1) the CPU controlling the CPLD by the southbridge chip, so as to implement the display control of the status indication light corresponding to reset and locate operation of the PCIE hard disk;
(2) being able to determine the usage status of the PCIE hard disk in real time;

(3) ensuring the accurate display of the status indication light by performing Hamming check to the information of the current operation mode.

SYMBOL DESCRIPTION

Figure 1:
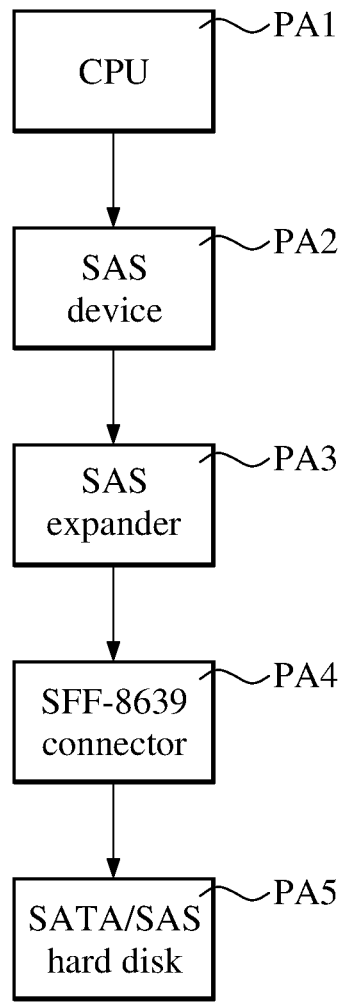
FIG. 1 illustrates a structure diagram of a system for controlling a status indication light of a SATA/SAS hard disk in the prior art.

PA1 CPU
PA2 SAS device
PA3 SAS expander
PA4 SFF-8639 connector
PA5 SATA/SAS hard disk
100 CPU
200 SFF-8639 connector
300 PCIE hard disk
1 Determining module
2 First transmitting module
3 Second transmitting module
4 Control module

DETAILED DESCRIPTIONS

The following is a description of embodiments of the present invention through specific examples, and those skilled in the art of the present invention can easily understand other advantages and effects of the present invention by the contents disclosed in the present specification. The present invention can also be implemented or applied through other different specific embodiments, and the details in this specification can also be applied based on different point of views. Various modifications or changes can be made without departing from the spirit of the present invention. It is noted that the technical features in the following embodiments and examples are allowed to be combined with each other as long as conflicts do not occur between them.

The embodiments of the present invention are described below with specific examples, and those skilled in the art can easily understand other advantages and effects of the present invention through the contents disclosed in this specification. The present invention can also be implemented or applied in another different specific embodiment, and based on different viewpoints and applications, every detail in this specification can also be modified or changed in various ways without departing from the spirit of the present invention. It should be explained that in the absence of conflict, the following embodiments and the features in those embodiments can be combined with each other.

It should be explained that the drawings provided in the following embodiments merely illustrate the basic idea of the present invention in a schematic manner, and merely the components related to the present invention are shown in the drawings, rather than the actual numbers, shapes, and sizes of the components in actual implementation. The type, quantity, and proportion of each component in the implementation may be an arbitrary change, and the layout of its components may also be more complex.

The method and system for controlling a status indication light of a PCIE hard disk of the present invention implement the display control of the status indication light corresponding to reset and locate operation of the PCIE hard disk by a complex programmable logic device (CPLD). The method and system for controlling the status indication light of the PCIE hard disk of the present invention generate data to the CPLD, and the CPLD can control the power supplied to PCIE hard disk so as to implement the control of the status indication light of the PCIE hard disk.

Figure 2:
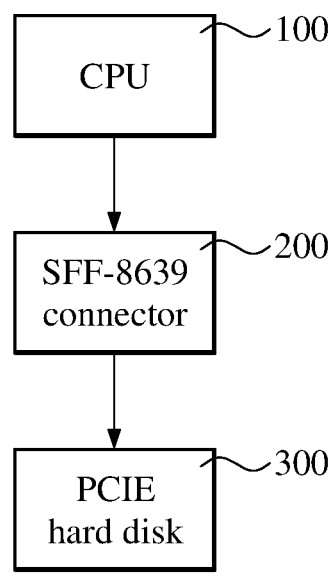
FIG. 2 illustrates a structure diagram of a system for controlling a status indication light of a PCIE hard disk in the technology of the present invention.

Please refer to FIG. 2. A CPU 100 adapts a PCIE signal line to a SAS signal line and is directly connected to a SFF-8639 connector 200, and the SFF-8639 connector 200 is external connected to a PCIE hard disk 300. In the present invention, the PCIE hard disk 300 refers to various hard disks that use PCIE interface to transmit data and signals, including PCIE solid-state hard disks (PCIE SSD).

Figure 3:
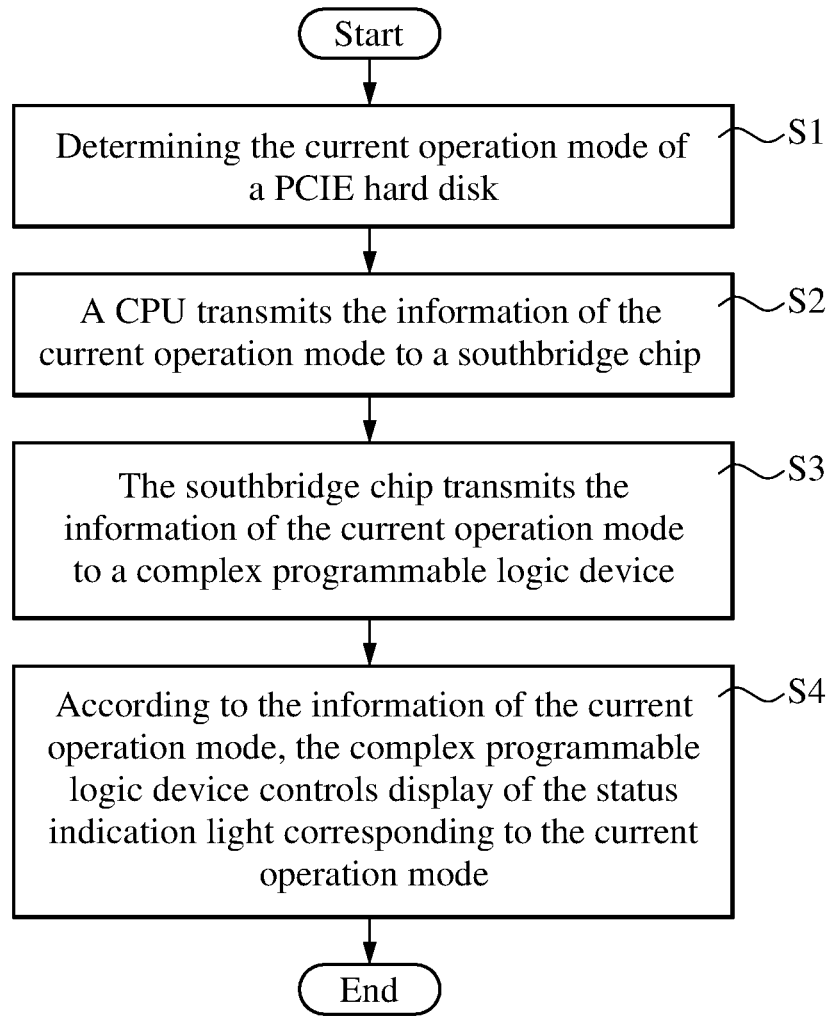
FIG. 3 illustrates a flow chart of a method for controlling a status indication light of a PCIE hard disk of the present invention.

Please refer to FIG. 3. A method for controlling a status indication light of a PCIE hard disk comprises the steps as follows:

Step S1: determining the current operation mode of the PCIE hard disk, wherein operation modes of the PCIE hard disk comprises a hard disk reset mode and a hard disk locate mode. In comparison with the conventional technology, the present invention adds the hard disk reset mode so as to determine the usage status of the PCIE hard disk in real time according to the display of the status indication light.

Step S2: the CPU transmits information of the current operation mode to a southbridge chip (Platform Controller Hub, PCH), wherein when the information of the current operation mode is transmitted to the PCH, an output level register corresponding to a GPIO serial port expander (GPIO Serial eXpander, GSX) of the southbridge chip is edited from the system end so as to record the information of the current operation mode. The output level register totally occupies 64 bits, wherein the lower 8 bits are occupied by a BIOS, and 2 bits of the remaining 56 bits excluding the lower 8 bits occupied by the BIOS of the 64 bits are used to indicate the operation mode of the PCIE hard disk. The high bits indicate the hard disk locate mode, and the low bits indicate the hard disk reset mode.

Step S3: the PCH transmits the information of the current operation mode to a complex programmable logic device.

Step S3 comprises the steps as follows:

31) performing Hamming check to the information of the current operation mode and generating Hamming check code data.

The Hamming check code can correct one-bit errors, detect two-bit errors and reduce the bit error rate in transmission. By the Hamming check, the information of the current operation mode may be accurately transmitted to ensure accurate display of LED status indication light.

32) transmitting the generated Hamming check code data to the CPLD.

Step S4: according to the information of the current operation mode, the complex programmable logic device controls the display of the status indication light corresponding to the current operation mode. Specifically, the CPLD analyzes the received data, obtains the information of the current operation mode, and outputs a signal to the corresponding LED status indication light so as to control the display of the corresponding LED status indication light.

In the conventional technology, the application scenario of a server includes 24 PCIE hard disk at most. The following describes the method for controlling the status indication light of the PCIE hard disk according to the application scenario of 12 hard disks.

First, the BASE ADDRESS (0xfed04000) of the register of the GSX is mapped to a memory using a MMAP function. The register totally occupies 0x400h bytes, and the offset of the output level register corresponding to the GSX is 0x30h. Since the lower 8 bits of the output level register is occupied by the BIOS, bit 8-bit 63 are used. However, for the ease of the calculation, in the design of encoding, the encoding is firstly performed in the order of bit 0 to bit 55, and the final value is shifted left by 8 bits and is outputted after performing OR operation with the lower 8 bits controlled by the BIOS. It should be noted that the above calculation is merely applied to the scenario of 12 hard disks, and the code should be fine-tuned for the implementation of the scenario of 24 hard disks.

The distribution relationship between hard disk numbers and their respective control bits is shown in the following table.

TABLE 1 the distribution relationship between hard disk numbers and their respective control bits

|  | hard disk 0 | hard disk 1 | hard disk 2 | hard disk 3 | hard disk 4 | hard disk 5 | hard disk 6 | hard disk 7 | hard disk 8 | hard disk 9 | hard disk 10 | hard disk 11 |
|---|---|---|---|---|---|---|---|---|---|---|---|---|
| reset | 0 | 2 | 4 | 6 | 8 | 10 | 12 | 14 | 16 | 18 | 20 | 22 |
| locate | 1 | 3 | 5 | 7 | 9 | 11 | 13 | 15 | 17 | 19 | 21 | 23 |

When Hamming check is performed to the information of the current operation mode, a Hamming check coed should be involved. The encoding rule of the Hamming check code is to insert check codes into the normal data bits, and to place them at 2n bit, n=0, 1, 2, 3, 4, and so on. The relationship between the length of the check codes and the length of the data bits is shown in table 2.

TABLE 2 the relationship between the length of the check codes and the length of the data bits

| Data bit | 1 | 2-4 | 5-11 | 12-26 | 27-57 | 58-120 | 121-247 |
|---|---|---|---|---|---|---|---|
| Check code | 2 | 3 | 4 | 5 | 6 | 7 | 8 |

Since merely 24 bits are required to indicate the two control bits of 12 hard disks, merely 5 check codes are required. The arrangement relationship of the combination of the check codes and the data bits is shown in table 3, wherein the data bit is represented by Di, and the check code is represented by Pj.

TABLE 3 the arrangement relationship of the combination of the check codes and the data bits

| 0 | 1 | 2 | 3 | 4 | 5 | 6 | 7 | 8 | 9 | 10 | 11 | 12 | 13 |
|---|---|---|---|---|---|---|---|---|---|---|---|---|---|
| P1 | P2 | D1 | P3 | D2 | D3 | D4 | P4 | D5 | D6 | D7 | D8 | D9 | D10 |
| 14 | 15 | 16 | 17 | 18 | 19 | 20 | 21 | 22 | 23 | 24 | 25 | 26 | 27 |
| D11 | P5 | D12 | D13 | D14 | D15 | D16 | D17 | D18 | D19 | D20 | D21 | D22 | D23 |
| 28 | | | | | | | | | | | | | |
| D24 | | | | | | | | | | | | | |

According to table 3, it should be known that:

The length of the entire check data is 29 bits. The check bit P1 starts from bit 0 and checks every other bit; that is to check bit 0, bit 2, bit 4, bit 6, bit 8 and so on.

The check bit P2 starts from bit 1, continuously checks two bits, skips two bits and checks two bits again; that is to check bit 1 and 2, bit 5 and 6, bit 9 and 10, and so on.

The check bit P3 starts from bit 3, continuously checks four bits, skips four bits and checks four bits again; that is to check bit 3, 4, 5, 6, bit 11, 12, 13, 14, bit 19, 20, 21, 22, and so on.

The check bit P4 starts from bit 7, continuously checks eight bits, skips eight bits and checks eight bits again; that is to check bit 7, 8, 9, 10, 11, 12, 13, 14, and bit 23, 24, 25, 26, 27, 28.

The check bit P5 starts from bit 15, continuously checks sixteen bits, skips sixteen bits and checks sixteen bits again; that is to check bit 15, 16, 17, 18, 19, 20, 21, 22, 23, 24, 25, 26, 27 and 28.

For a back plate with 12 hard disks, merely total 29 bits of data bits and check bits are required, so the excess part is no longer checked. In the scenario of 24 hard disks, 6 check codes are required, so the procedure has to be adjusted accordingly.

In the following, a check code is generated using even parity; that is, the number of the data bits of each check code to be checked and the check codes themselves which include "1" is even. The specific check relationship is shown in table 4.

TABLE 4 the check relationship between the check codes and data bits

| Bit location | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| Encoding data bit | | p1 | p2 | d1 | p4 | d2 | d3 | d4 | p8 | d5 | d6 | d7 | d8 | d9 | d10 | d11 | p16 |
| Parity | p1 | X | | X | | X | | X | | X | | X | | X | | X | |
| check | p2 | | X | X | | | X | X | | | X | X | | | X | X | |
| bit | p4 | | | | X | X | X | X | | | | | X | X | X | X | |
| range | p8 | | | | | | | | X | X | X | X | X | X | X | X | |
| | p16 | | | | | | | | | | | | | | | | X |

| Bit location | | 16 | 17 | 18 | 19 | 20 | 21 | 22 | 23 | 24 | 25 | 26 | 27 | 28 |
|---|---|---|---|---|---|---|---|---|---|---|---|---|---|---|
| Encoding data bit | | d12 | d13 | d14 | d15 | d16 | d17 | d18 | d19 | d20 | d21 | d22 | d23 | d24 |
| Parity | p1 | X | | X | | X | | X | | X | | X | | X |
| check | p2 | | X | X | | | X | X | | | X | X | | |
| bit | p4 | | | | X | X | X | X | | | | | X | X |
| range | p8 | | | | | | | | X | X | X | X | X | X |
| | p16 | X | X | X | X | X | X | X | X | X | X | X | X | X |

Valid data is placed in the correct Hamming code location. The code based on the relationship between the original encoding locations and the Hamming code locations is shown as follows:

```
if(0 == strcmp(argv[1], ResetCmd))
{
//gsxOut0 = 0x1<<hd_index;
base = 2;
/*The empty location is reserver for parity bit.*/
if(hd_index >= 1)
offset++;
if(hd_index >= 2)
offset++;
if(hd_index >= 6)
offset++;
}
if(0 == strcmp(argv[1], LocateCmd) || 0 == strcmp(argv[1], UnFreezeCmd))
{
//gsxOut0 = 0x02<<hd_index;
base = 4;
/*The empty location is reserver for parity bit.*/
if(hd_index >= 2)
offset++;
if(hd_index >= 5)
offset++;
}
if(0 == strcmp(argv[1], UnFreezeCmd))
gsxOut0 &= ~(1<<(hd_index * 2 + base + offset)); //unfreeze action need to clear the locate bit of corresponding hard disk.
else
gsxOut0 |= 1 <<(hd_index * 2 + base + offset); //move the locate bit to the correct location.
```

After the valid data is placed in the correct location, the code of generating the check data is shown as follows:

```
for(i = 0; i < MaxParityIndex; i++)
{
counter = 0;
parityBit = 0;
dataPower = (0x1<<i)-1;
gsxOut0 &= ~(0x1<<dataPower); //Clear the parity bit.
for(j = dataPower; j < TotalBitsNumber; j++)
{
```

-continued

```
parityBit += ((gsxOut0 >>j)& 0x1);
counter ++;
if(counter == (0x1 << i))
{
j += counter;
counter = 0;
}
}
gsxOut0 |= ((parityBit & 0x1) << dataPower); // even parity check, save the parity bit to corresponding location.
}
gsxOut1 = (gsxOut0 >> 24);
gsxOut0 = (gsxOut0 << 8) | (value_olvl1 & 0x000000FF);
```

Since the lower 8 bits that are used by the BIOS have to be reserved in addition to the data bit plus the parity bit, the total of the transmitted data overflows from the 32 bits of the output register 0 of the GSX.

```
/*BIOS set the default value to 0xFFFFFFFF, and we need to clean this
value when the value is 0xFFFFFFFF to 0x000000FF.
* And we need to keep the Locate LED data when system not reset.*/
if(value_olvl1 == 0xFFFFFFFF)
gsxOut0 = (value_olvl1 & 0x000000FF) >> 8;
else
gsxOut0 = (value_olvl1 >> 8) | (value_olvl2 <<24);
```

Finally, the calculated data is written back into the output level register of the GSX. Similarly, since the data overflows from the output register 0 of the GSX, the overflowing data is stored in the output register 1 of the GSX.

```
*((unsigned int *)addr_olvl1) = gsxOut0;
*((unsigned int *)addr_olvl2) = gsxOut1;
And, a serial number process is enabled.
addr_CMD= gsx_base + 0x40;
*((unsigned int *)addr_CMD)=1;
For the call of hardware reset, after transmitting the data, the original data
has to be reset and it does not have to be maintained since the reset
operation is merely one-time operation.
if(0 == strcmp(argv[1], ResetCmd)) //the reset command need to clean the
reset bit after transfer.
```

-continued

```
{
*((unsigned int *)addr_olvl1) = value_olvl1;//zwg 2015-07-24 the locate
action need keep data.
So disable this code.
*((unsigned int *)addr_olvl2) = value_olvl2;
{
Finally, the transmission is stopped.
*((unsigned int *)addr_CMD)=0; the operation is completed.
```

Figure 4:
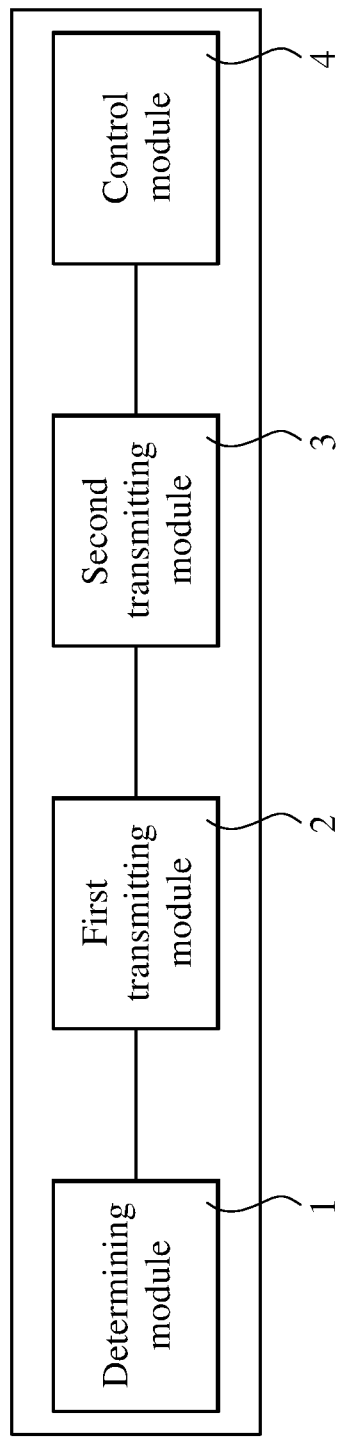
FIG. 4 illustrates a structure diagram of a system for controlling a status indication light of a PCIE hard disk of the present invention.

Please refer to FIG. 4. The system for controlling a status indication light of a PCIE hard disk comprises a determining module 1, a first transmitting module 2, a second transmitting module 3 and a control module 4.

The determining module 1 is configured to determine the current operation mode of the PCIE hard disk, wherein the operation modes of the PCIE hard disk comprises a hard disk reset mode and a hard disk locate mode. In comparison with the conventional technology, the present invention adds the hard disk reset mode so as to determine the usage status of the PCIE hard disk in real time according to the display of the status indication light.

The first transmitting module 2 is connected with the determining module 1, and configured to transmit the information of the current operation mode to a PCH by a CPU. When the determining module 1 transmits the information of the current operation mode to the PCH, the output level register corresponding to a GPIO serial port expander (GPIO Serial eXpander, GSX) of the southbridge chip is edited from the system end so as to record the information of the current operation mode. The output level register totally occupies 64 bits, wherein the lower 8 bits are occupied by a BIOS, and 2 bits of the remaining 56 bits excluding the lower 8 bits occupied by the BIOS of the 64 bits are used to indicate the operation mode of the PCIE hard disk. The high bits indicate the hard disk locate mode, and the low bits indicate the hard disk reset mode.

The second transmitting module 3 is connected with the first transmitting module 2, and configured to transmit the information of the current operation mode to a complex programmable logic device by the PCH.

The second transmitting module 3 transmits the information of the current operation mode by the steps as follows:
31) performing Hamming check to the information of the current operation mode and generating Hamming check code data.
The Hamming check code can correct one-bit errors, detect two-bit errors and reduce the bit error rate in transmission. By the Hamming check, the information of the current operation mode may be accurately transmitted to ensure accurate display of LED status indication light.
32) transmitting the generated Hamming check code data to the CPLD.

The control module 4 is connected with the second transmitting module 3, and configured to control display of a status indication light corresponding to the current operation mode according to the information of the current operation mode by the complex programmable logic device. Specifically, the CPLD analyzes the received data, obtains the information of the current operation mode, and outputs a signal to the corresponding LED status indication light so as to control the display of the corresponding LED status indication light. In view of the above description, the control method and the CPU of the system in the present invention control the CPLD by the southbridge chip, so as to implement the display control of the status indication light corresponding to reset and locate operation of the PCIE hard disk; thus, the usage status of the PCIE hard disk may be determined in real time. Furthermore, by performing Hamming check to the information of the current operation mode, the accurate display of LED status indication light may be further ensured. Therefore, the present invention may effectively overcome various defects in the prior art and have a high industrial utilization value.

The above embodiments merely illustrate the principles of the present invention and its effects in an exemplary manner, but are not intended to limit the present invention. Any person skilled in the art can modify or change the above embodiments without departing from the spirit and scope of the present invention. Therefore, all equivalent modifications or changes which is made by a person having ordinary skill in the art and without departing from the spirit and technical thought disclosed in the present invention should still be covered by the claims of the present invention.

The invention claimed is:

1. A method for controlling a status indication light of a Peripheral Component Interconnect Express hard disk, comprising steps as follows:
    determining a current operation mode of the Peripheral Component Interconnect Express (PCIE) hard disk;
    transmitting information of the current operation mode to a southbridge chip by a central processing unit (CPU);
    transmitting the information of the current operation mode to a complex programmable logic device by the southbridge chip; and
    controlling display of the status indication light corresponding to the current operation mode according to the information of the current operation mode by the complex programmable logic device;
    wherein when the information of the current operation mode is transmitted to the southbridge chip, the information of the current operation mode is recorded by an output level register corresponding to a GPIO serial port expander of the southbridge chip;
    wherein the output level register totally occupies 64 bits, lower 8 bits are reserved for use by a basic input/output system (BIOS), and 2 bits of remaining 56 bits excluding the lower 8 bits reserved for the use by the BIOS of the 64 bits are used to indicate an operation mode of the PCIE hard disk.

2. The method for controlling the status indication light of the PCIE hard disk according to claim 1, wherein operation modes of the PCIE hard disk comprises a hard disk reset mode and a hard disk locate mode.

3. The method for controlling the status indication light of the PCIE hard disk according to claim 1, wherein transmitting the information of the current operation mode to the complex programmable logic device by the southbridge chip comprises steps as follows:
    performing Hamming check to the information of the current operation mode and generating Hamming check code data; and
    transmitting the generated Hamming check code data to the complex programmable logic device.

4. A system for controlling a status indication light of a PCIE hard disk, comprising:
    a determining module, configured to determine a current operation mode of the PCIE hard disk;
    a first transmitting module, connected with the determining module, and configured to transmit information of the current operation mode to a southbridge chip by a central processing unit (CPU);
    a second transmitting module, connected with the first transmitting module, and configured to transmit the information of the current operation mode to a complex programmable logic device by the southbridge chip; and a control module, connected with the second transmitting module, and configured to control display of the status indication light corresponding to the current operation mode according to the information of the current operation mode by the complex programmable logic device;

wherein when the first transmitting module transmits the information of the current operation mode to the southbridge chip, an output level register corresponding to a GPIO serial port expander of the southbridge chip is used to record the information of the current operation mode;

wherein the output level register totally occupies 64 bits, lower 8 bits are reserved for use by a basic input/output system (BIOS), and 2 bits of remaining 56 bits excluding the lower 8 bits reserved for the use by the BIOS of the 64 bits are used to indicate an operation mode of the PCIE hard disk.

5. The system for controlling the status indication light of the PCIE hard disk according to claim 4, wherein operation modes of the PCIE hard disk comprise a hard disk reset mode and a hard disk locate mode.

6. The system for controlling the status indication light of the PCIE hard disk according to claim 4, wherein when the southbridge chip transmits the information of the current operation mode to the complex programmable logic device, steps are comprised as follows:

performing Hamming check to the information of the current operation mode and generating Hamming check code data; and transmitting the generated Hamming check code data to the complex programmable logic device.

* * * * *